United States Patent
Lair et al.

(10) Patent No.: US 8,434,715 B2
(45) Date of Patent: May 7, 2013

(54) NESTED FAIRING THRUST REVERSER

(76) Inventors: Jean-Pierre Lair, San Antonio, TX (US); Paul Weaver, Quebec (CA)

( * ) Notice: Subject to any disclaimer, the term of this patent is extended or adjusted under 35 U.S.C. 154(b) by 142 days.

(21) Appl. No.: 12/845,889

(22) Filed: Jul. 29, 2010

(65) Prior Publication Data
US 2011/0101159 A1    May 5, 2011

Related U.S. Application Data

(60) Provisional application No. 61/229,874, filed on Jul. 30, 2009.

(51) Int. Cl.
F02K 1/60 (2006.01)
F02K 1/54 (2006.01)

(52) U.S. Cl.
USPC .................. 244/110 B; 244/129.5; 60/226.2; 60/230

(58) Field of Classification Search .............. 244/110 B, 244/12.5, 23 D, 53 R; 60/226.2, 230
See application file for complete search history.

(56) References Cited

U.S. PATENT DOCUMENTS

| | | | |
|---|---|---|---|
| 4,519,561 A * | 5/1985 | Timms ...................... 244/110 B |
| 5,097,661 A | 3/1992 | Lair et al. |
| 5,392,991 A | 2/1995 | Gatti et al. |
| 5,615,834 A | 4/1997 | Osman |
| 5,779,192 A * | 7/1998 | Metezeau et al. ......... 244/110 B |
| 5,785,249 A * | 7/1998 | Metezeau et al. ........ 239/265.19 |
| 5,826,823 A | 10/1998 | Lymons et al. |
| 5,836,149 A | 11/1998 | Servanty |
| 5,943,856 A | 8/1999 | Lillibridge et al. |
| 6,260,801 B1 * | 7/2001 | Peters et al. ............... 244/110 B |
| 6,311,928 B1 * | 11/2001 | Presz et al. ................ 244/110 B |
| 6,688,099 B2 * | 2/2004 | Lair ............................. 60/226.2 |
| 7,104,500 B1 * | 9/2006 | Smith ........................ 244/110 B |
| 7,735,778 B2 * | 6/2010 | Lair et al. .................. 244/110 B |
| 8,015,797 B2 * | 9/2011 | Lair ............................. 60/226.2 |
| 2003/0159430 A1 | 8/2003 | Lair |
| 2008/0072570 A1 * | 3/2008 | Lair ............................. 60/226.2 |
| 2009/0126339 A1 | 5/2009 | Lair |
| 2009/0126340 A1 | 5/2009 | Lair |
| 2009/0126341 A1 | 5/2009 | Lair |
| 2009/0126342 A1 | 5/2009 | Lair |
| 2009/0127390 A1 | 5/2009 | Lair |
| 2009/0127391 A1 | 5/2009 | Lair et al. |
| 2009/0313969 A1 | 12/2009 | Lair et al. |

* cited by examiner

Primary Examiner — Philip J Bonzell
Assistant Examiner — Marc Burgess
(74) Attorney, Agent, or Firm — Francis L. Conte

(57) ABSTRACT

A thrust reverser nozzle for a gas turbine engine nacelle includes opposite and asymmetrically pivoting first and second doors defining a nacelle aft section, first and second trailing edges of the first and second doors adjacent to a propulsive jet nozzle outlet of the nacelle, the doors being pivotable simultaneously between a stowed position and a deployed position such that the first trailing edge is positioned behind the second trailing edge when the doors are in the deployed position, and the first and second fairings attached to the first and second doors in relative fixed positions to the first and second doors respectively. Male contour middle portions of the first fairings may complementarily match female contour middle portions of the second fairings and are received within the female contour middle portion when the doors are in the stowed position. The fairings may be removably attached to the doors.

19 Claims, 6 Drawing Sheets

NESTED FAIRING THRUST REVERSER

CROSS REFERENCE TO RELATED APPLICATIONS

This application claims a benefit of a priority filing date to U.S. Provisional Application Ser. No. 61/229,874, filed on Jul. 30, 2009, titled "Thrust Reverser".

FIELD OF THE INVENTION

The invention relates generally to aircraft gas turbine engines and, more particularly, to clamshell thrust reversers for the aircraft gas turbine engines.

BACKGROUND OF THE INVENTION

Clamshell thrust reversers on gas turbine engines have to fulfill at least two functions. A first function is to provide an exhaust nozzle for the direct thrust generated by the engine while thrust reverser is stowed. A second function is to redirect the engine thrust in order to provide a decelerating force or thrust reversal after landing and while the thrust reverser is deployed.

Since almost the entire flight sequence occurs with the thrust reverser in the stowed position, it is desirable that the thrust reverser does not degrade the direct thrust performance of the engine during flight. Clamshell thrust reverser nozzles are also referred to as target or bucket thrust reversers or thrust reverser nozzles.

While many thrust reverser models have been used successfully for a number of years, there is always a need to provide further improved arrangements.

SUMMARY OF THE INVENTION

A thrust reverser nozzle for a gas turbine engine nacelle includes opposite first and second doors defining an aft section of the nacelle. The first and second doors are pivotable simultaneously between a stowed position and a deployed position. First and second fairings are attached to the first and second doors in relative fixed positions to the first and second doors respectively.

The first fairing and the second fairing complementarily match when the first and second doors are in the stowed position.

The first and second fairings may have first and second geometries sized and shaped for allowing a second leading portion of the second fairing to move about and over a laterally outer side of a first trailing portion of the first fairing when the first and second doors are deployed from the stowed position.

BRIEF DESCRIPTION OF THE DRAWINGS

The foregoing aspects and other features of the invention are explained in the following description, taken in connection with the accompanying drawings where.

DETAILED DESCRIPTION OF THE INVENTION

Figure 1:
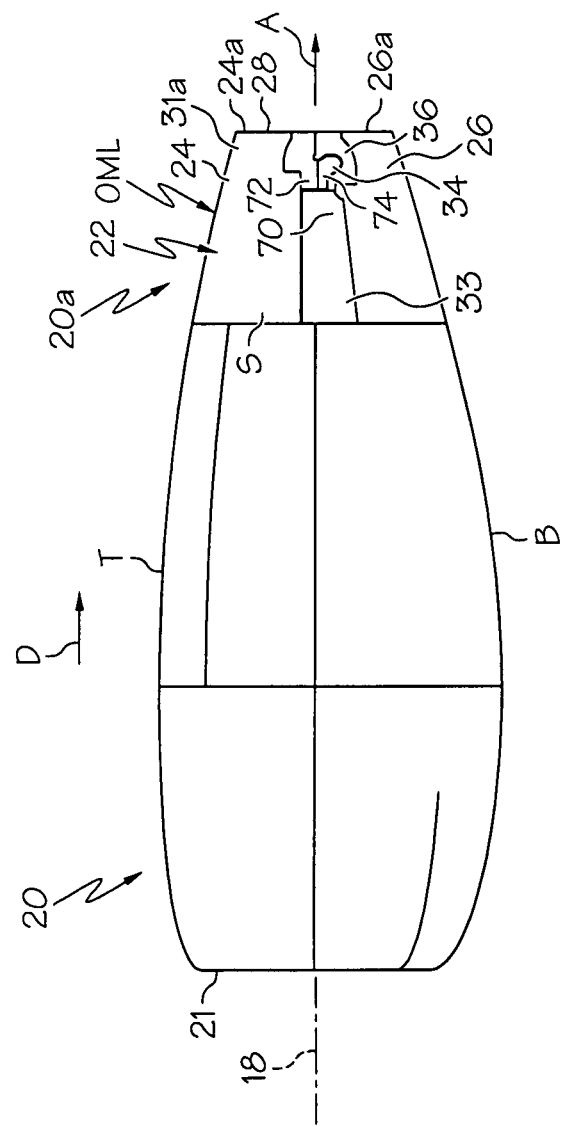
FIG. 1 is a side view of an exemplary nacelle with a clamshell thrust reverser having doors illustrated in a stowed position.

Illustrated in FIG. 1, is an exemplary engine nacelle 20 for an aircraft gas turbine. The nacelle 20 extends in a downstream direction, indicated by downstream pointing arrow D, from a nacelle inlet 21 to a planar nozzle outlet 28. The nacelle 20 includes a clamshell thrust reverser nozzle 22 in an aft section 20a of the nacelle 20 ending at the planar nozzle outlet 28.

The operative components of the turbofan gas turbine engine are located within the nacelle 20 and the nacelle 20 is attached under the wings or on the fuselage of an aircraft using an appropriate arrangement (not shown).

The thrust reverser nozzle 22 includes opposite and asymmetrically pivoting upper and lower doors 24, 26 forming most of the propulsive jet nozzle outlet 28 of the nacelle 20 when they are in a stowed position as illustrated in FIG. 1.

The upper door 24 of the illustrated example may be located in an upper portion of the aft section 20a of the nacelle 20 and the lower door 26 may be located in a lower portion of the aft section 20a. The upper and lower doors 24, 26 are generally semi-circular in cross section in planes perpendicular to an axial center axis 18.

The upper and lower doors door 24, 26 have upper and lower trailing edges 24a, 26a respectively adjacent to the propulsive jet nozzle outlet 28. Arrow A in FIG. 1 illustrates nozzle exhaust flow which provides the engine with thrust. The thrust reverser nozzle 22 provides the outlet 28 of the nacelle 20. The thrust reverser nozzle 22 is circumscribed about the center axis 18 of the nacelle 20.

Figure 2:
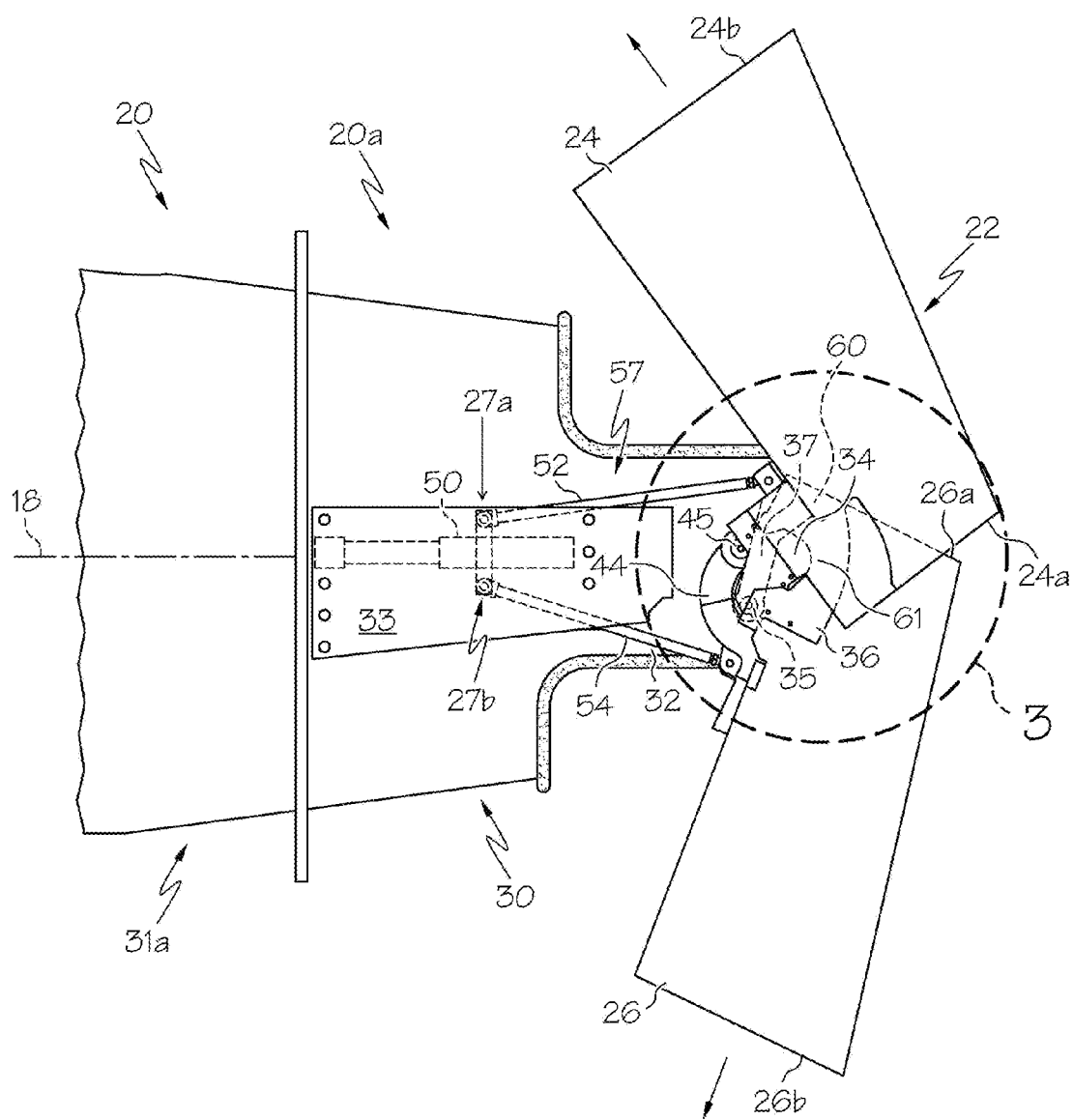
FIG. 2 is a side view of an aft section of the nacelle illustrated in FIG. 1, with the doors in a deployed position.

Referring to FIG. 2, the upper and lower doors 24, 26 are pivotally connected to side arms 32 of a jet pipe 30 located inside the aft section 20a of the nacelle 20. The upper and lower trailing edges 24a, 26a are located at the rear of the upper and lower doors 24, 26 respectively and are referred to as "trailing" edges with reference to the travel path of the aircraft.

The upper and lower leading edges 24b, 26b of the upper and lower doors 24, 26 and their outer wall form a smooth continuity with the upstream parts of the nacelle 20 when the doors 24, 26 are in the stowed position as illustrated in FIG. 1. The upper and lower leading edges 24b, 26b are located at the front of the upper and lower doors 24, 26 and are referred to as "leading" edges with reference to the travel path of the aircraft.

FIG. 2 schematically shows an example of the interior side of the nacelle 20 depicting the jet pipe 30. The jet pipe 30 and its side arms 32 are concealed inside the aft section 20a of nacelle 20 when the doors 24, 26 are in their stowed position, as in FIG. 1.

The engine is in a thrust reversal mode in FIG. 2. This mode is generally used immediately after landing an aircraft on a runway. The upper and lower doors 24, 26 are pivoted to that position simultaneously using actuators 50 and upper and lower linkages 27a, 27b which include upper and lower links 52, 54 between the actuators 50 and the upper and lower doors 24, 26.

Each of inboard and outboard sides 31a, 31b (see FIG. 4 and relative to the aircraft not shown) of the thrust reverser nozzle 22 includes a single linear actuator 50 located between the upper and lower doors 24, 26 and in substantially a horizontal plane that contains the center axis 18.

Each actuator 50 is connected to the upper and lower links 52, 54 which in turn are connected to the upper and lower doors 24, 26 respectively. The upper and lower links 52, 54 asymmetrically connect the actuators 50 to the upper and lower doors 24, 26.

Figure 3:
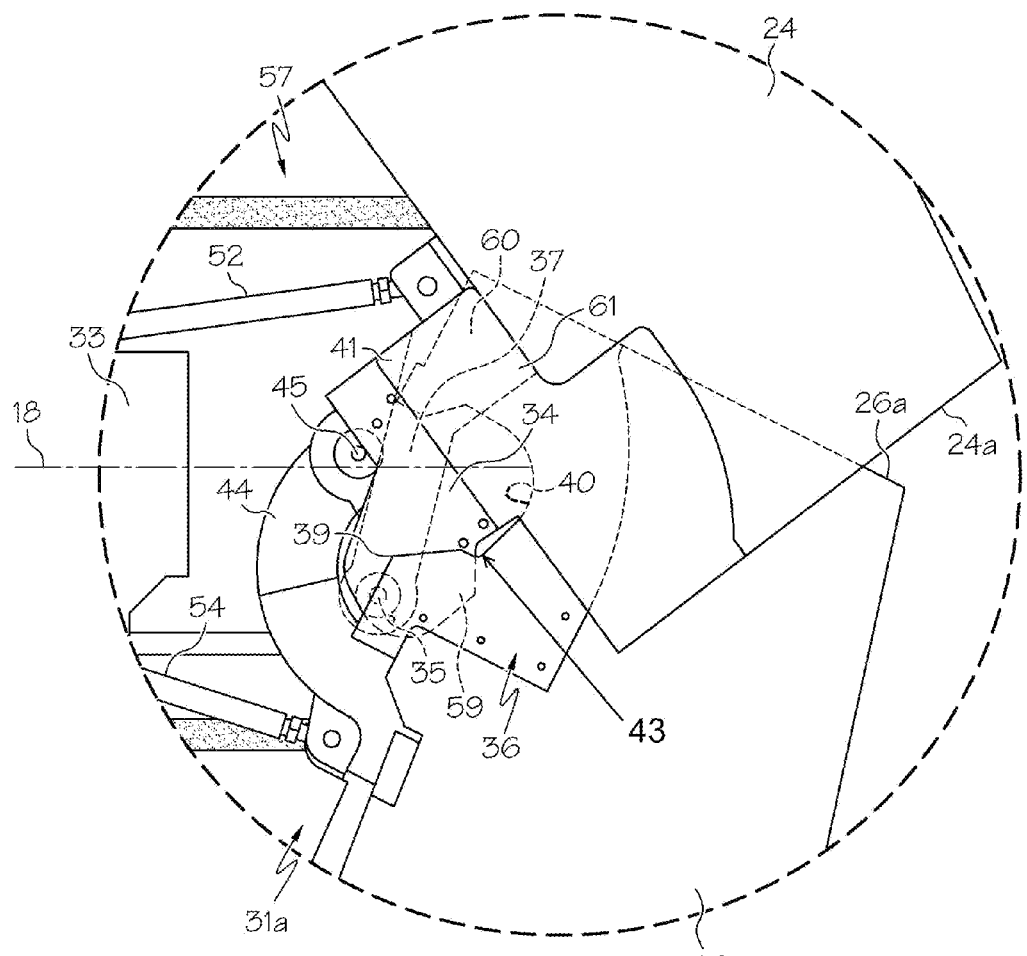
FIG. 3 is an enlarged view of the aft section of the nacelle illustrated in FIG. 2, with the doors in the deployed position.

Illustrated in FIGS. 2 and 3 is a linkage system 57 including the upper and lower linkages 27a, 27b for moving the upper and lower doors 24, 26 from their stowed position to a deployed position and vice-versa. The upper and lower doors 24, 26 are connected, on each side, to a fixed structure around which a linking arm pivots. The fixed structure is illustrated herein as the jet pipe 30.

The upper door 24 has a straight upper linking arm 37 pivoting around a substantially horizontal upper hinge axis or pivot axis 35 located below the center axis 18.

The lower door 26 is connected to a curved or partially circular lower linking arm 44 pivoting around a substantially horizontal lower hinge axis or pivot axis 45 located along or slightly above the center axis 18.

It should be noted that the upper and lower linking arms 37, 44 can have any other shape, in accordance with the design requirements, including opposite L-shaped and straight respectively.

The upper and lower linking arms 37, 44 of upper and lower doors 24, 26 are connected to their respective door at a point that is upstream of their respective upper and lower pivot axes 35, 45. This is advantageous in terms of rigidity since the outer diameter of the upper and lower doors 24, 26 is larger in the upstream direction and the upper and lower doors narrow in diameter in the downstream direction.

Both arms are also circumferentially curved to follow and fit in the annular space defined by the inner and outer contours of the thrust reverser nozzle 22. The upper and lower linking arms 37, 44 on both sides of the upper and lower doors 24, 26 are laterally offset from each other so as to prevent them from colliding.

The upper and lower pivot axes 35, 45 of the upper and lower doors 24, 26 lay in a common vertical plane normal to the center axis 18. The lower pivot axis 45 of the lower door 26 is closer to the center axis 18 than the upper pivot axis 35 of the upper door 24. This allows for the asymmetrical pivoting of the upper and lower doors 24, 26 such that the upper trailing edge 24a of the upper door 24 is pivoted axially behind the lower trailing edge 26a of the lower door 26 when the upper and lower doors 24, 26 are deployed.

The upper and lower doors 24, 26 are asymmetrically pivoted from their stowed position as illustrated in FIG. 1 to their deployed position as illustrated in FIG. 2. In the embodiment illustrated herein, the lower trailing edge 26a of the lower door 26 pivots into the upper door 24. The upper and lower doors 24, 26 are pivoted up to an angle where the propulsive jet coming out of the engine is deflected by the doors 24, 26 and can generate a force having a forward axial component which provides the retarding force to the aircraft. Therefore, once the upper and lower doors 24, 26 are in their deployed positions, increasing the output thrust generated by the engine creates an aerodynamic decelerating force.

Figure 4:
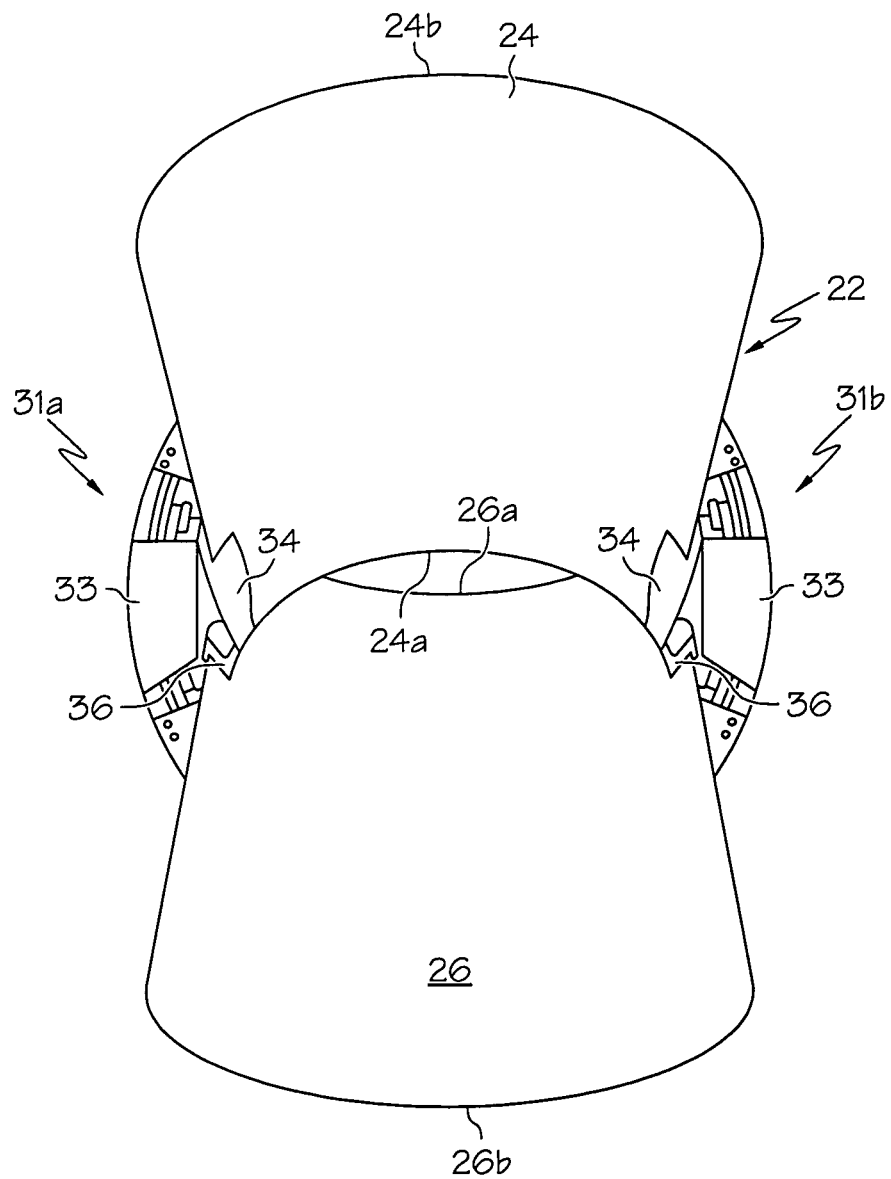
FIG. 4 is a rear view of the aft section of the nacelle illustrated in FIG. 2, with the doors in the deployed position.

FIGS. 2, 3 and 4 illustrate that the upper trailing edge 24a of the upper door 24 is pivoted axially behind the lower trailing edge 26a of the lower door 26 when the upper and lower doors 24, 26 are deployed. This results from the asymmetrical positioning of the door's pivots with reference to a horizontal center plane of the jet pipe 30 as disclosed, for instance, in U.S. patent application Ser. No. 11/534,202, issued as U.S. Pat. No. 8,015,797, entitled "THRUST REVERSER NOZZLE FOR A TURBOFAN GAS TURBINE ENGINE", filed Sep. 21, 2006 by Jean-Pierre Lair one of the named co-inventors in the present patent which is incorporated herein by reference.

FIG. 4 illustrates the deployed doors of FIG. 2 from the rear. Any configuration and pivot-axis positioning allowing the positioning of one of the upper and lower doors 24, 26 behind the other of the upper and lower doors 24, 26 may be used.

As illustrated in FIGS. 1-6 the upper and lower doors 24, 26 are separated on each side by front, upper, and lower fairings 33, 34, 36. The fairings cover the actuators, the various linkages and other parts in that area. The nacelle 20 defines an outer aerodynamic shape, referred to herein as outer mold lines (OML) of the thrust reverser nozzle 22.

The fairings form part of the outer mold lines (OML) along an outer surface S of the nacelle 20 when the upper and lower doors 24, 26 are stowed. The outer surface S is designed to be aerodynamically smooth, preferably having no bumps.

The front fairings 33 are fixed to the jet pipe 30. The upper fairings 34 are attached to the upper door 24 and in a relative fixed position to the upper door 24 and the lower fairings 36 are attached to the lower door 26 in a relative fixed position to the lower door 26.

Figure 6:
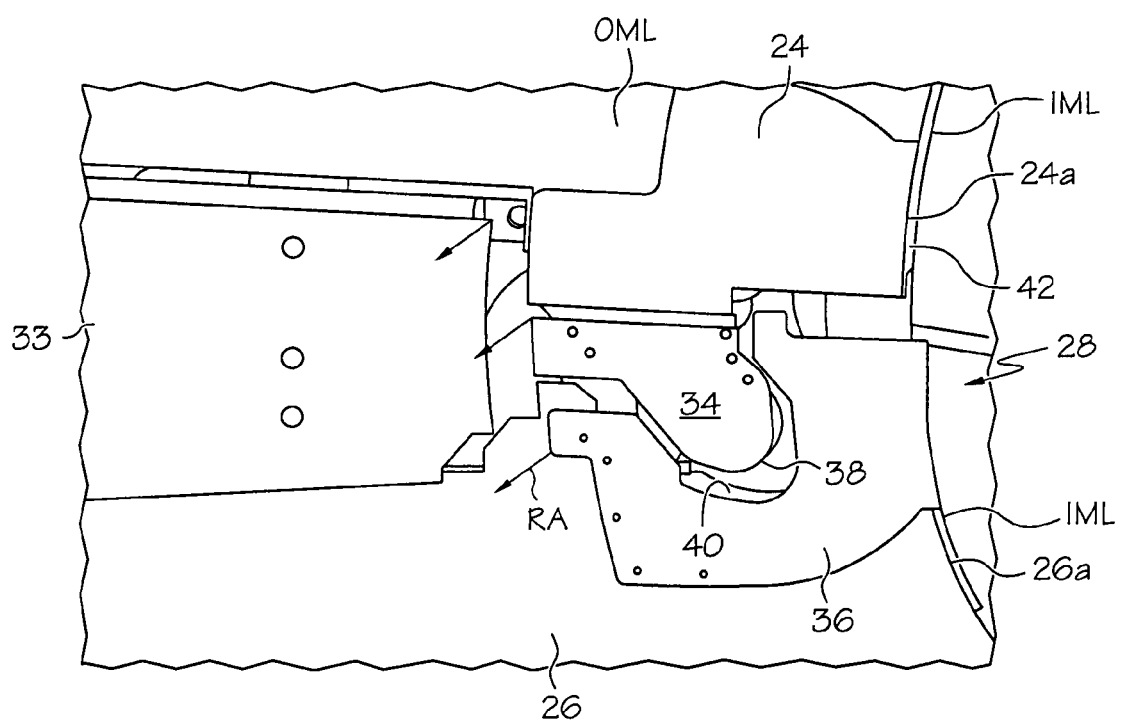
FIG. 6 is an enlarged view of the aft section of the nacelle of FIG. 5, with fairings removed.

An interior of the jet pipe 30, together with an interior of the upper and lower doors when stowed, define an inner aerodynamic shape or nozzle for direct exhaust gases of the engine, and this inner shape or surface is referred to herein as inner mold lines (IML) of the assembly (see FIG. 6).

The actuators, pivots and pivot arms of the doors must reside within the envelope defined by the outer mold lines (OML) and inner mold lines (IML). The mechanical complexity of the thrust reverser system may be reduced by the relative fixed position mounting of the front, upper, and lower fairings 33, 34, 36 when compared to other systems that feature pivoting fairings. Reduced weight, a smaller number of parts, and improved reliability of the present thrust reverser system may also result.

Referring to FIGS. 1-5, there are two of each of the front fairings 33, upper fairings 34 and lower fairings 36 on the thrust reverser nozzle 22. One of each pair of front fairings 33, upper fairings 34, and lower fairings 36 is inboard and the other of each pair is outboard. They may be mirror images of each other.

Figure 5:
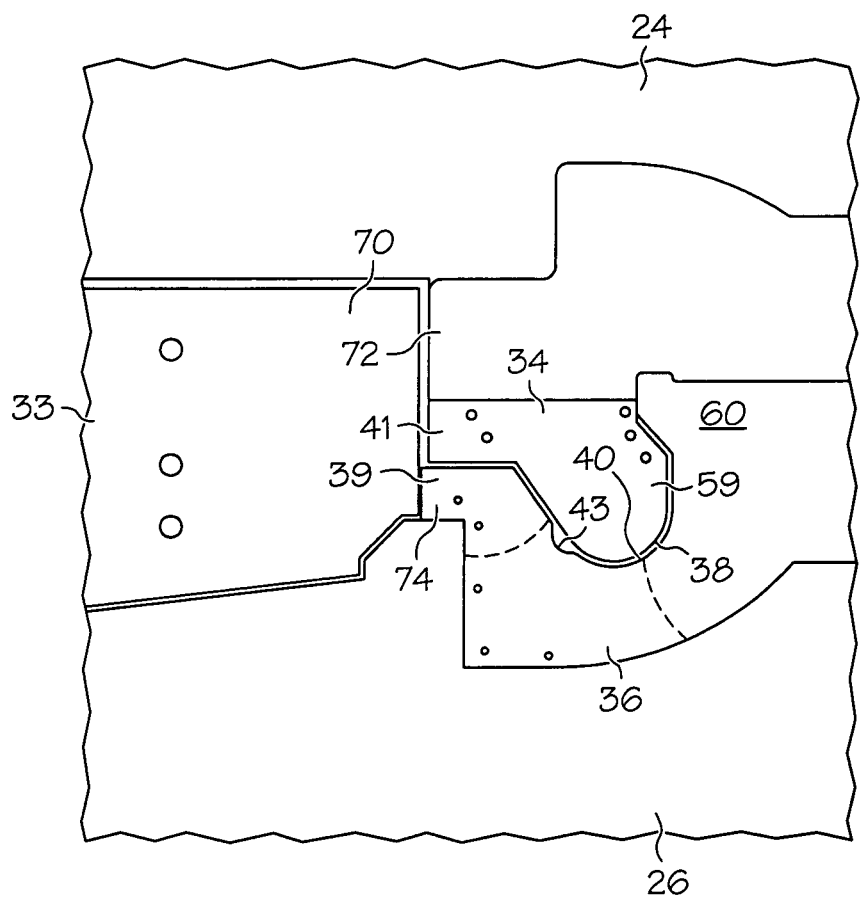
FIG. 5 is an enlarged side view of the aft section of the nacelle illustrated in FIG. 2, with the doors in the stowed position.

Referring to FIGS. 1, 3, and 5, the upper and lower fairings 34, 36 have specific geometries or contours in order to concurrently integrate with the outer mold lines OML of the nacelle 20, when the upper and lower doors 24, 26 are in the stowed position.

The upper fairing 34 is suitably configured to include an upper fairing leading portion 41 followed aft by an upper fairing middle portion 38, and further followed aft by an upper fairing trailing portion 59 to specially mate with the lower fairing 36.

The lower fairing 36 is suitably configured to include a lower fairing leading portion 39 followed aft by a lower fairing middle portion 40, and further followed aft by a lower fairing aft portion 60 to complement and nest within the adjoining upper fairing 34.

The fairing geometries also allow the lower leading portion 39 of the lower fairings 36 to move about and over a laterally outer side of the upper trailing portion 59 of the upper fairings 34, when the upper and lower doors 24, 26 are deployed from the stowed position.

Referring to FIG. 5, the upper middle portions 38 of the upper fairings 34 have an arcuate or convex male contour complementarily matching an arcuate or concave female contour of the lower middle portions 40 of the lower fairings 36. The male contoured upper middle portion 38 is received within the female contoured lower middle portion 40 when the upper and lower doors 24, 26 are in the stowed position.

When the doors are deployed to the deployed position illustrated in FIG. 2, the male contoured upper fairing middle portion 38 rotates with respect to the also rotating female contoured lower fairing middle portion 40, and moves out from the female contoured lower fairing middle portion 40 and under the lower fairing 36. While the lower fairing forward portion 39 of the lower fairing 36 moves to an upper fairing exterior of the corresponding upper fairing 34, the lower fairing aft portion 60 of the lower fairing 36 moves to an interior of the upper door 24 behind the upper fairing leading portion 41 of the upper fairing 34, as shown in FIGS. 3 and 5.

Alternatively, depending on the shape of the upper fairings 34, the lower fairing aft portion 60 of the lower fairing 36 may move to an upper fairing interior of the upper fairing 34.

The above-referred relative movement between the upper and lower fairings 34, 36 employs the tapering of the outer surface S and the outer mold lines OML in the aft section 20a of the nacelle 20 in a downstream direction D towards the propulsive jet nozzle outlet 28.

The outer surface S of the aft section 20a is generally conical and slightly conically curved in the axial direction with respect to the center axis 18. As can be readily observed in FIG. 1, curvature in the axial direction of the outer surface S and the outer mold lines OML is more pronounced along a bottom B than a top T of the outer surface S of the nacelle 20, but in the aft section 20a the outer mold lines OML are similar along the bottom B and the top T of the outer surface S.

As seen in FIGS. 3 and 5, the portion of the lower fairing 36 that moves to the exterior of the upper fairing 34 is illustrated at 39, whereas the portion of the lower fairing 36 that moves to the interior of the upper fairing 34 is illustrated at 60.

As the lower fairing forward portion 39 of the lower fairing 36 is upstream of the covered first trailing portion 59 of the upper fairing 34 as illustrated in FIGS. 3 and 5, it forms a portion of the outer mold lines OML that has a greater diameter than the first trailing portion 59 of the upper fairing 34 it covers when deployed due to the tapering of the aft section 20a of the nacelle 20.

Similarly, as the lower fairing aft portion 60 of the lower fairing 36 is downstream of the covering portion 41 of the upper fairing 34 (referred to above as the upper fairing leading portion 41 of the upper fairing 34), it forms a portion of the outer mold lines OML that has a smaller diameter than the covering portion 41 of the upper fairing 34 covering it when deployed because of the tapering of the aft section 20a of the nacelle 20. As shown in FIG. 3, a small clearance 43 between the upper and lower fairings 34, 36 may be required to allow unobstructed movement between the upper and lower fairings 34, 36.

The outer surface S of the nacelle 20 in the aft section 20a including the front, upper, and lower fairings 33, 34, 36 conically tapers in the downstream direction D and is curved about the center axis 18. The more particular embodiment of the outer surface S of the nacelle 20 in the aft section 20a illustrated herein is conically curved axially with respect to the center axis 18. Thus, the upper and lower doors 24, 26 and the front, upper, and lower fairings 33, 34, 36 may be individually referred to as being conically curved and tapering in the downstream direction D.

The front fairings 33 may also have an aft contour portion 70 complementarily shaped to upper and lower contour portions 72, 74 of the upper and lower fairings 34, 36 to integrate concurrently with the outer mold lines OML of nacelle 20. As shown in FIG. 5, the rearmost contour of the front fairing 33 matches forward contours of the upper and lower fairings 34, 36.

As disclosed above the front, upper, and lower fairings 33, 34, 36 are respectively attached and in a fixed position with respect to the structure of the jet pipe 30, the upper door 24 and the lower door 26 respectively. The front, upper, and lower fairings 33, 34, 36 may be readily removable to access an interior of the nacelle 20, by the handling of fasteners for example, without the need for extensive adjustments when reinstalling same. Removability of the front, upper, and lower fairings 33, 34, 36 is indicated by three corresponding removal direction arrows RA in FIG. 6.

As illustrated in FIG. 6, the front fairings 33 may be removed from the structure of the jet pipe 30 to access the actuation system of the upper and lower doors 24, 26. The removal of the upper fairings 34 may provide access to the hinge mechanisms of the upper door 24, whereas the removal of the lower fairings 36 may provide access to the hinges of the lower door 26. The front, upper, and lower fairings 33, 34, 36 may provide access to other components of the gas turbine engine.

Moreover, the geometry of the front, upper, and lower fairings 33, 34, 36 and their fixed relation to structural parts of the gas turbine engine allow the outer mold lines OML, nacelle wetted area or outer surface S, and a nacelle base area 42 at the propulsive jet nozzle outlet 28 of the nacelle 20 to be re-established when the upper and lower doors 24, 26 return to the stowed position. The nacelle base area 42 is defined as the area between the outer mold lines (OML) and inner mold lines (IML) at the planar nozzle outlet 28 of the nacelle 20 as illustrated in FIG. 6.

Accordingly, the front, upper, and lower fairings 33, 34, 36 generally maintain the nacelle drag in comparison with a nacelle not equipped with a thrust reverser.

The thrust reverser 22 described above includes first and second reverser doors 24, 26 pivotally mounted at corresponding first and second hinge linking arms, 37, 44 to opposite sides of the jet pipe 30 and converging aft to the common nozzle outlet 28 in the stowed closed position.

When viewed as in FIG. 3, the first door 24 has the first fairing 34 and the second door 26 has the adjoining second fairing 36 which fairings collectively 1 cover the adjacent first and second hinge axes 35, 45. The upper first fairing 34 covers the lower-door hinge axis 45, whereas the lower second fairing 36 covers the upper-door hinge axis 35 since the two linking arms 37, 44 extend into the opposite doors.

The first and second fairings 34, 36 have complementary contours adjoining each other at a small clearance or gap 43 therebetween to correspondingly scissor with forward and aft overlaps as the two doors 24, 26 pivot open to the deployed position.

The upper door 24 pivots upwardly and carries the upper fairing 34 therewith. The lower door 26 pivots downwardly and carries the lower fairing 36 therewith. And, the two fairings pivot from their initially stowed positions conforming flush with each other and the outer mold line surfaces of the stowed doors to their deployed positions in which the two fairings must rotate relative to each other in scissor-like fashion with axially opposite ends thereof clearing each other with suitable circumferential overlaps to avoid interference or binding.

When viewed as in FIG. 5, the two fairings are initially nested flush with each other both axially and circumferentially along their common interface or clearance joint when stowed, but overlap or nest each other circumferentially when the doors are deployed open.

The first fairing 34 includes the forward, middle, and aft portions 41, 38, 59 correspondingly adjoining the forward, middle, and aft portions 39, 40, 60 of the second fairing 36 when the doors are stowed.

The forward portions 41, 39 of the first and second fairings 34, 36 overlap the aft portions 60, 59 of the second and first fairings 36, 34, respectively, as the fairings scissor about the middle portions 38, 40 thereof when the doors 24, 26 are rotated open during deployment.

As shown in FIG. 5, a periphery of the middle portion 38 of the first fairing 34 is convex downwardly toward the lower fairing 36, and a periphery of the middle portion 40 of the second fairing 36 is complementarily concave upwardly toward the upper fairing 34 for permitting unobstructed scissoring overlap of the cooperating fairings 34, 36 as the doors 24, 26 are deployed.

The doors 24, 26 are pivotally mounted by their hinge axes 35, 45 to the jet pipe 30 for clamshell deployment with the trailing edge 24a of the second door 26 nesting inside the trailing edge 26a of the first door 24 when deployed.

The aft portion 59 of the first fairing 34 is disposed radially inwardly of or inside the forward portion 39 of the second fairing 36 while the forward portion 41 of the first fairing 34 is disposed radially outwardly of or outside the aft portion 60 of the second fairing 36 when the doors are deployed.

The doors 24, 26 have their outer mold line surfaces converging aft to the nozzle outlet 28 to maximize efficiency of the exhaust nozzle during flight.

The first and second fairings 34, 36 complement and conform with each other when the doors 24, 26 are stowed flush, and converge aft to conform axially and circumferentially with the outer mold line surfaces of the doors 24, 26.

The jet pipe 30, doors 24, 26, and fairings 34, 36 converge aft to a planar nozzle outlet 28, with the fairings 34, 36 being mounted flush with the doors 24, 26 when stowed for reducing wetted drag external surface area of the reverser 22 and minimizing base area around the planar nozzle outlet 28.

The actuation system 50, 52, 54 is suitably mounted to the jet pipe 30 and is operatively joined to the doors 24, 26 for deploying open the doors 24, 26 to the deployed position and stowing closed the doors 24, 26 to the stowed position.

The front fairing 33 covers a large portion of the actuation system 50 and conforms flush with the doors 24, 26 and first and second fairings 34, 36.

The front, first, and second fairings 33, 34, 36 are removably attached to the jet pipe 30 and doors 24, 26 using suitable fasteners for permitting access to the actuation system 50 and hinges during maintenance inspections.

The fairings 34, 36 provide small integral extensions of the reverser doors themselves with contours complementing each other and adjoining the cooperating front fairings 33 in a smooth and flush portion of the outer mold surface behind which are hidden the actuation and pivoting systems for the doors.

The reverser remains compact in size and closely matches the optimum configuration of the ideal exhaust nozzle if the reverser were not used.

Aerodynamic performance of the nested fairing thrust reverser may be optimized to reduce external nacelle drag while increasing internal nozzle efficiency with the engine exhaust being efficiently discharged through the planar nozzle outlet.

The above description is meant to be exemplary only, and one skilled in the art will recognize that many changes may also be made to the embodiments described without departing from the inventions disclosed.

For instance, the exact shape of the illustrated elements (nacelle, doors, etc.) may be different. Although the doors are described herein and shown in the figures as being an upper reverser door and a lower reverser door movable in a vertical plane, doors can also be configured as left and rights door movable in a horizontal plane.

Likewise, the skilled reader will appreciate that it is possible to provide an arrangement in which the trailing edge of the lower door opens behind the trailing edge of the front door, as mentioned above, and other arrangements of the trailing edges are also available.

Other door arrangements employing the present invention are possible, as well, and therefore this description is not to be understood as limited to the door mounting orientation and configuration depicted, nor the target/bucket type depicted.

Still other modifications which fall within the scope of the present invention will be apparent to those skilled in the art, in light of a review of this disclosure, and such modifications are intended to fall within the appended claims.

The present invention has been described in an illustrative manner. It is to be understood that the terminology which has been used is intended to be in the nature of words of description rather than of limitation.

While there have been described herein, what are considered to be preferred and exemplary embodiments of the present invention, other modifications of the invention shall be apparent to those skilled in the art from the teachings herein and, it is, therefore, desired to be secured in the appended claims all such modifications as fall within the true spirit and scope of the invention.

Accordingly, what is desired to be secured by Letters Patent of the United States is the invention as defined and differentiated in the following claims:

1. A thrust reverser nozzle for a gas turbine engine nacelle, the thrust reverser nozzle comprising:
    opposite and asymmetrically pivoting first and second doors defining an aft section of the nacelle,
    the first and second doors including first and second trailing edges respectively adjacent to a nozzle outlet of the nacelle,
    the first and second doors being pivotable simultaneously between a stowed position and a deployed position,
    the first trailing edge of the first door being positioned behind the second trailing edge of the second door in the deployed position,
    first and second fairings attached to the first and second doors in relative fixed positions to the first and second doors respectively, and having complementary adjoining contours permitting relative rotation to avoid interference as said doors are deployed open the first fairing including leading, middle, and trailing portions correspondingly adjoining leading, middle, and trailing portions of the second fairing when the doors are stowed, and
    the leading portions of the first and second fairings overlapping the trailing portions of the second and first fairings, respectively, as the fairings move about the middle portions when the doors are deployed.

2. The thrust reverser nozzle as claimed in claim 1 wherein:
    the first fairings include male contour middle portions,
    the second fairings include female contour middle portions, and
    the male contour middle portion complementarily matches the female contour middle portion for the male contour middle portion being received within the female contour middle portion when the first and second doors are in the stowed position.

3. The thrust reverser nozzle as claimed in claim 2, further comprising the first and second fairings being removably attached to the first and second doors respectively.

4. The thrust reverser nozzle as claimed in claim 2, further comprising a clearance between the first and second fairings for allowing initial movement between the first and second fairings during deploying and/or stowing of the first and second doors respectively.

5. The thrust reverser nozzle as claimed in claim 4, further comprising the first and second fairings having first and second geometries sized and shaped for allowing the leading portion of the second fairings to move about and over a laterally outer side of the trailing portion of the first fairings when the first and second doors are deployed from the stowed position.

6. The thrust reverser nozzle as claimed in claim 1, further comprising the first and second fairings being conical and tapering in a downstream direction.

7. The thrust reverser nozzle as claimed in claim 1, further comprising:
   front fairings mounted to a jet pipe disposed radially inwardly of the first and second doors,
   the front fairing located upstream of the first and second fairings, and
   an outer surface of the nacelle in the aft section including the front, first, and second fairings conically tapering in a downstream direction with the outer surface conically tapering in the downstream direction.

8. The thrust reverser nozzle as claimed in claim 7, further comprising the front fairings having a front contour portion complementarily shaped to first and second contour portions of the first and second fairings.

9. The thrust reverser nozzle as claimed in claim 7 further comprising the outer surface being aerodynamically smooth and having no bumps.

10. The thrust reverser nozzle as claimed in claim 9 wherein:
    the first fairings include male contour middle portions,
    the second fairings include female contour middle portions, and
    the male contour middle portion complementarily matches the female contour middle portion for the male contour middle portion being received within the female contour middle portion when the first and second doors are in the stowed position.

11. The thrust reverser nozzle as claimed in claim 10, further comprising the first and second fairings being removably attached to the first and second doors respectively.

12. The thrust reverser nozzle as claimed in claim 10, further comprising a clearance between the first and second fairings for allowing initial movement between the first and second fairings during deploying and/or stowing of the first and second doors respectively.

13. The thrust reverser nozzle as claimed in claim 10, further comprising the first and second fairings having first and second geometries sized and shaped for allowing the portion of the second fairings to move about and over a laterally outer side of the trailing portion of the first fairings when the first and second doors are deployed from the stowed position.

14. A thrust reverser comprising:
    first and second reverser doors pivotally mounted at corresponding first and second hinge axes to opposite sides of a jet pipe and converging aft to a common nozzle outlet in a stowed closed position;
    said first door having a first fairing and said second door having an adjoining second fairing collectively covering said first and second hinge axes;
    said first and second fairings having complementary contours adjoining each other to scissor with forward and aft overlaps as said doors pivot open to a deployed position;
    said first fairing including forward, middle, and aft portions correspondingly adjoining forward, middle, and aft portions of said second fairing when said doors are stowed; and
    said forward portions of said first and second fairings overlapping said aft portions of said second and first fairings, respectively, as said fairings scissor about said middle portions when said doors are deployed.

15. A reverser according to claim 14 wherein said middle portion of said first fairing is convex, and said middle portion of said second fairing is complementarily concave for permitting unobstructed scissoring overlap of said fairings as said doors are deployed.

16. A reverser according to claim 14 wherein:
    said doors are pivotally mounted to said jet pipe for clamshell deployment with a trailing edge of said second door nesting inside a trailing edge of said first door when deployed; and
    said aft portion of said first fairing is disposed inside said forward portion of said second fairing while said forward portion of said first fairing is disposed outside said aft portion of said second fairing when deployed.

17. A reverser according to claim 14 wherein:
    said doors have outer mold line surfaces converging aft to said nozzle outlet; and
    said first and second fairings complement and conform with each other when said doors are stowed, and converge aft to conform axially and circumferentially with said outer mold line surfaces of said doors.

18. A reverser according to claim 14 wherein said jet pipe, doors, and fairings converge aft to a planar nozzle outlet, with said fairings being mounted flush with said doors when stowed for reducing wetted drag external surface area of said reverser and minimizing base area around said planar nozzle outlet.

19. A reverser according to claim 14 further comprising:
    an actuation system operatively joined to said doors for deploying open said doors to said deployed position and stowing closed said doors to said stowed position;
    a front fairing covering said actuation system and conforming flush with said doors and first and second fairings; and
    said front, first, and second fairings are removably attached to said jet pipe and doors for permitting access to said actuation system and hinges.

* * * * *

UNITED STATES PATENT AND TRADEMARK OFFICE
CERTIFICATE OF CORRECTION

PATENT NO. : 8,434,715 B2
APPLICATION NO. : 12/845889
DATED : May 7, 2013
INVENTOR(S) : Jean-Pierre Lair and Paul Weaver It is certified that error appears in the above-identified patent and that said Letters Patent is hereby corrected as shown below:

In the Claims

Col. 8, line 50, Claim 1, line 17, add a -- , -- after "open," and begin "the first fairing ..." on next line as new paragraph.
Col. 9, line 57, Claim 13, line 4, insert -- leading -- as first word before "portion of the second fairings."

Signed and Sealed this
Thirteenth Day of August, 2013

Teresa Stanek Rea
*Acting Director of the United States Patent and Trademark Office*